Aug. 8, 1933.   J. KUCHAR   1,921,233
CABLE REEL TRANSPORTING VEHICLE
Filed May 6, 1931   4 Sheets-Sheet 4
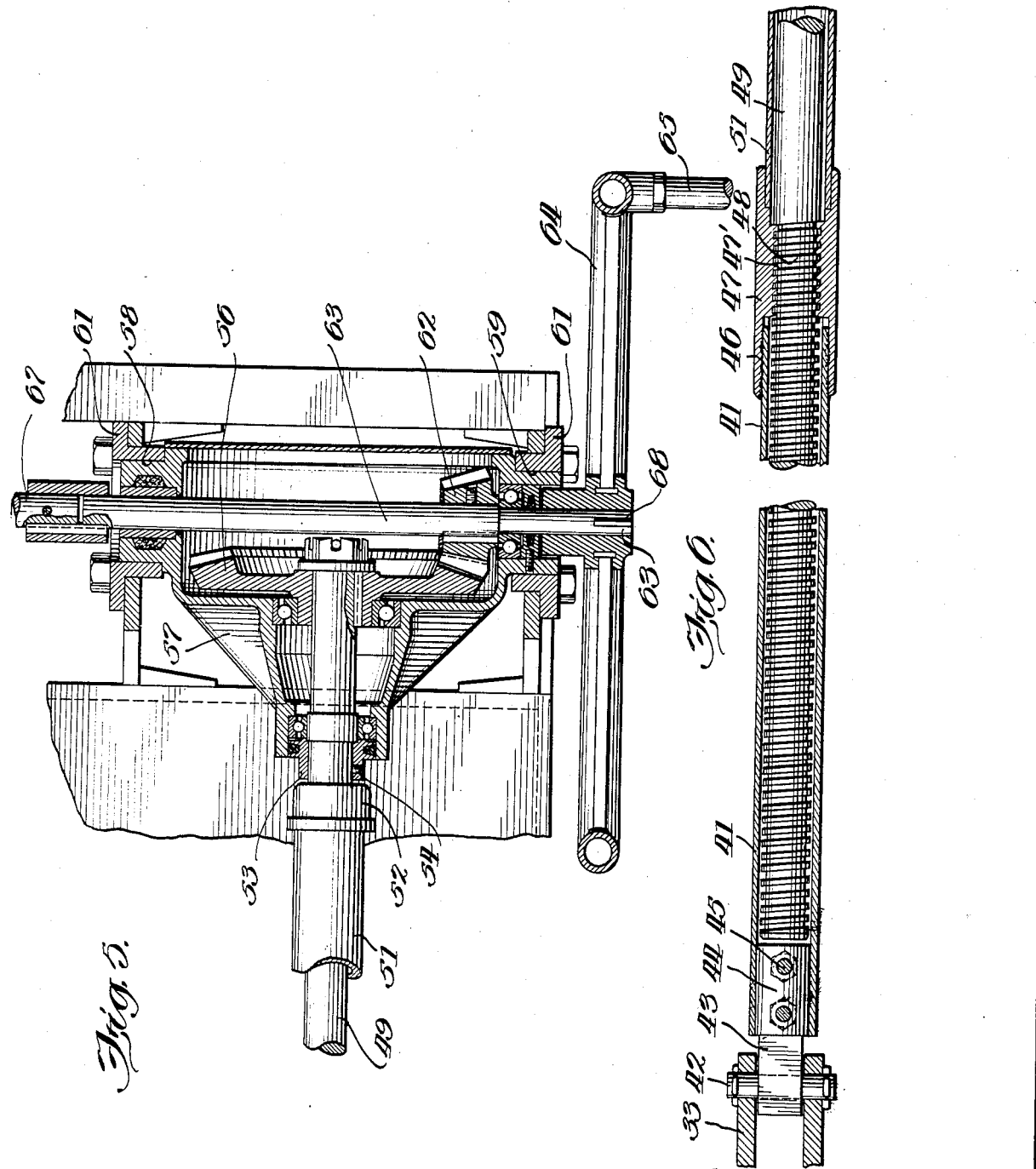
Inventor:
Joseph Kuchar
By Williams, Bradbury, McCaleb & Hinkle
Attys.

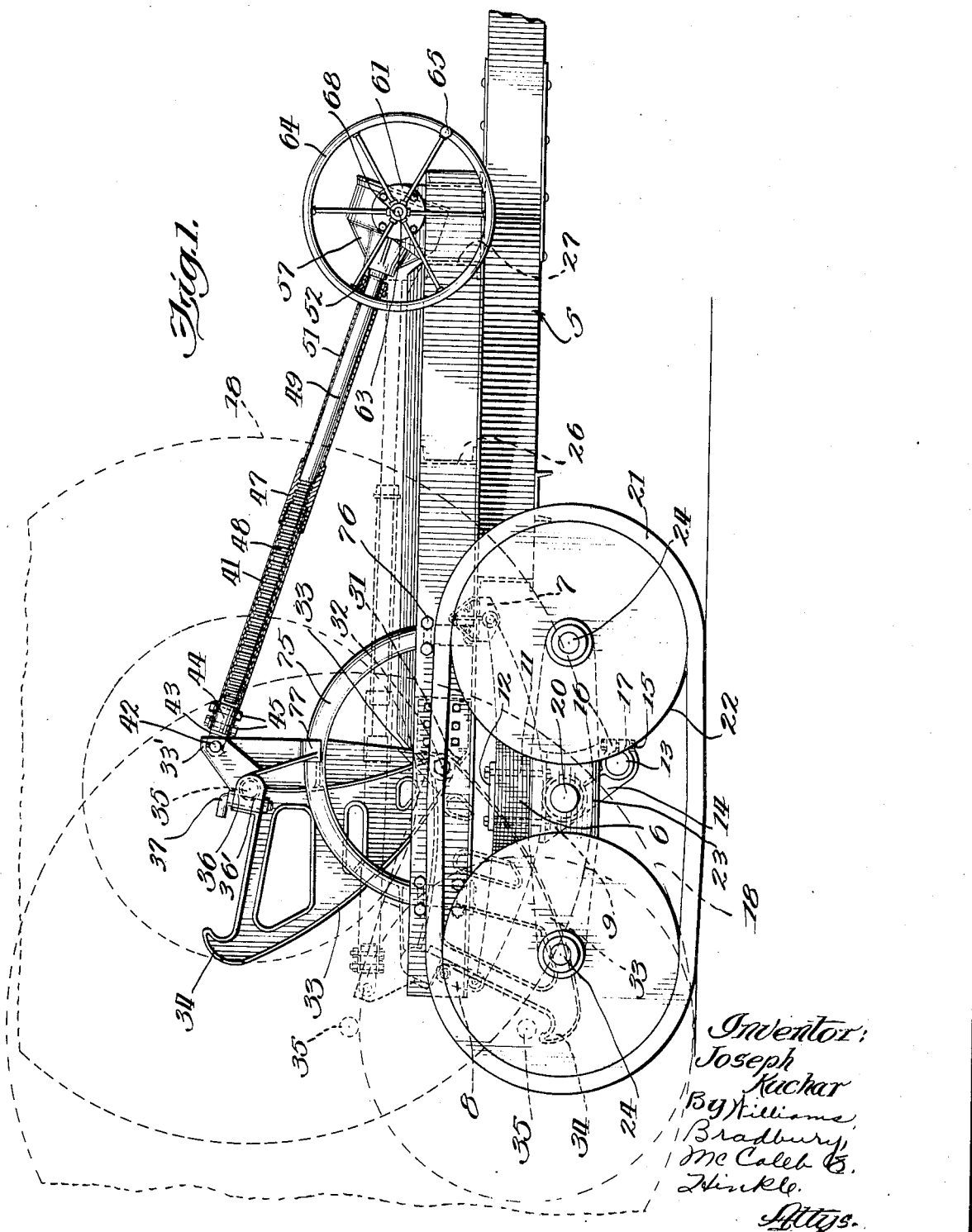

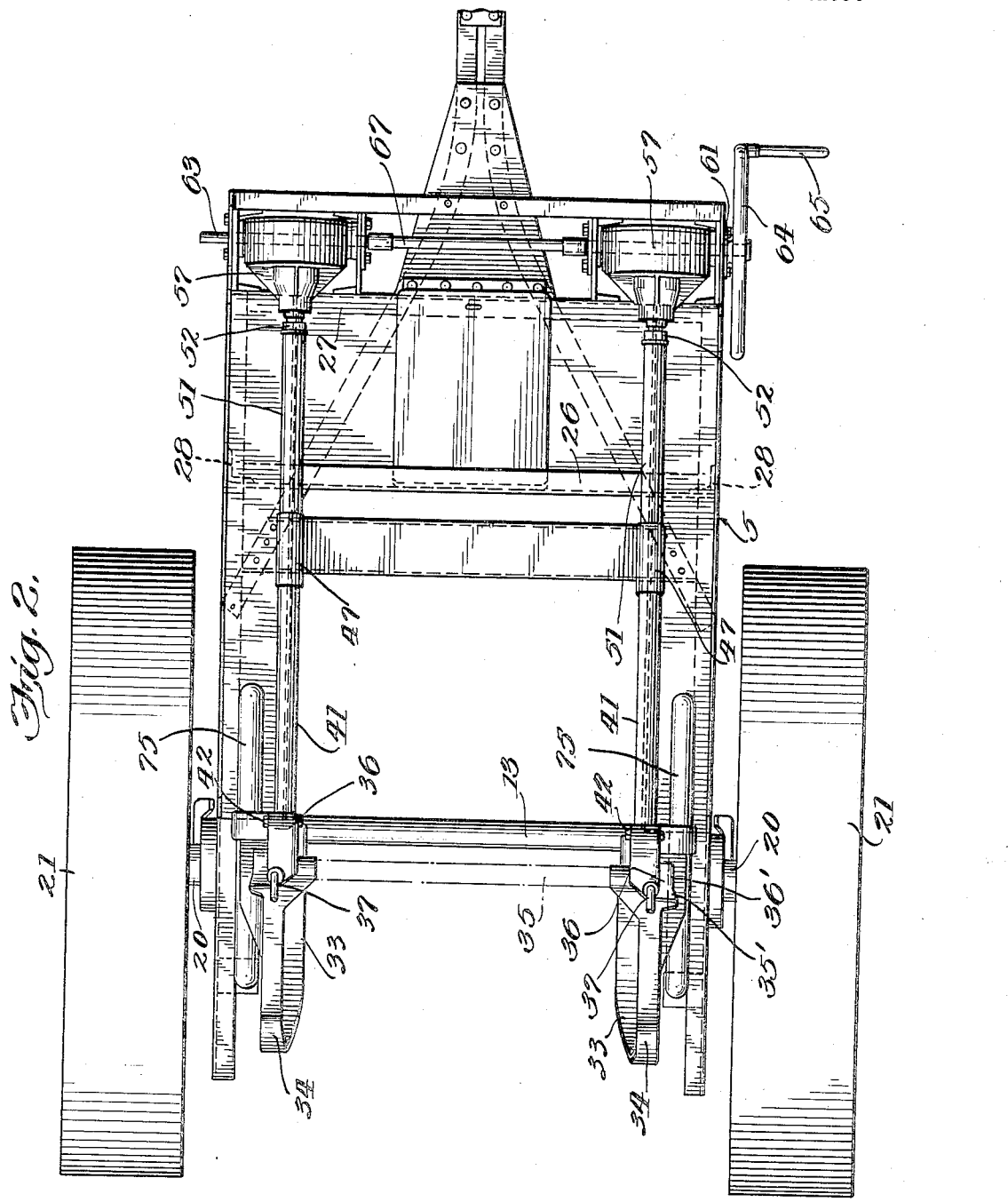

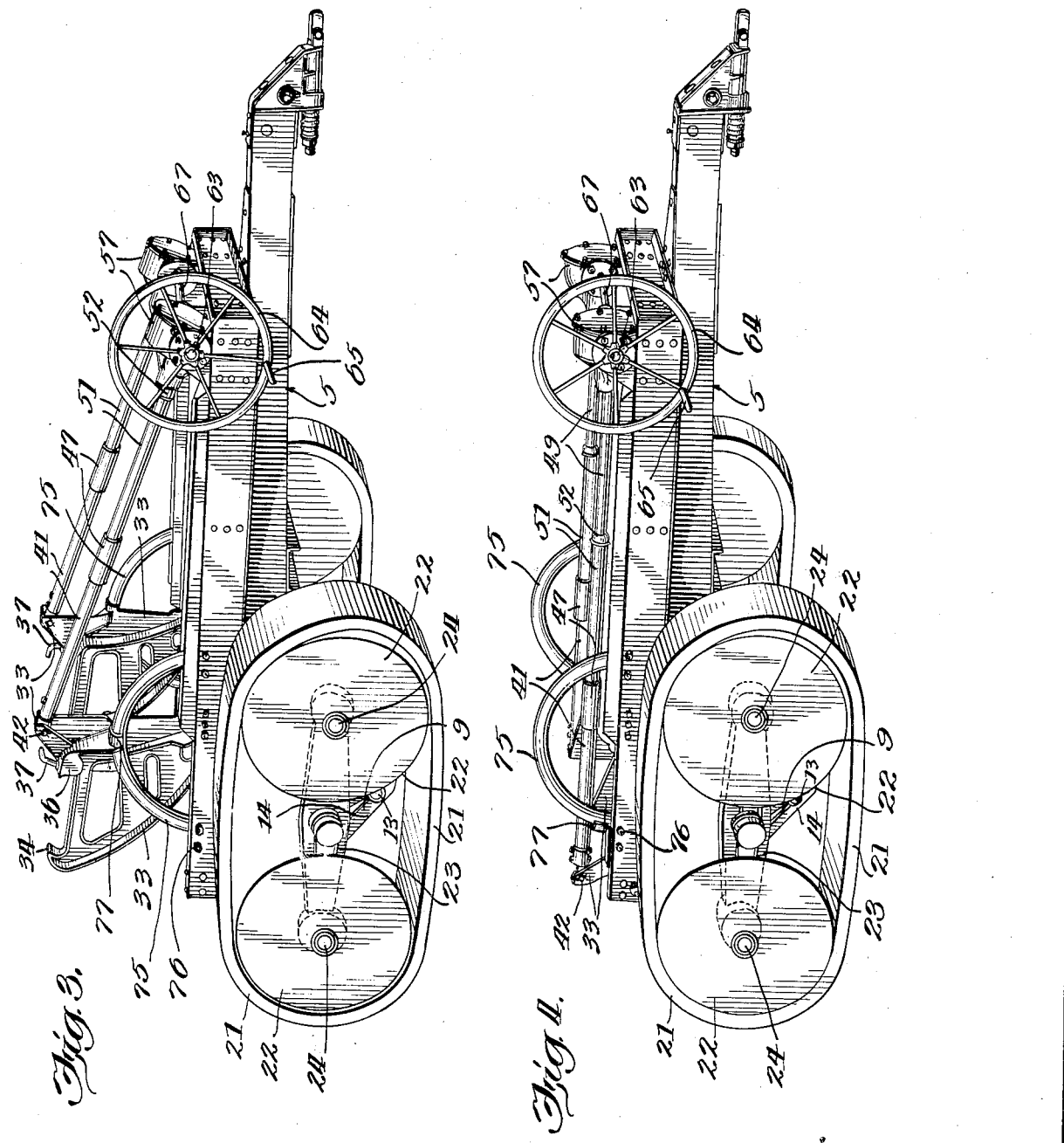

Patented Aug. 8, 1933

1,921,233

UNITED STATES PATENT OFFICE 1,921,233

CABLE REEL TRANSPORTING VEHICLE

Joseph Kuchar, Chicago, Ill., assignor to Athey Truss Wheel Co., Chicago, Ill., a Corporation of Illinois Application May 6, 1931. Serial No. 535,439

19 Claims. (Cl. 214—65)

My invention relates to cable reel transporting vehicles, and more particularly to such vehicles suitable as a trailer for a tractor or the like and comprising a hoisting mechanism whereby cable reels of various dimensions may be hoisted from the ground to transporting position and may again be lowered to the ground.

This application is in part a continuation of my pending application, Serial No. 463,069, filed June 23, 1930.

An object of this invention is the provision of such a vehicle combined with a caterpillar type wheel unit which permits the reel to be transported across soft prairie land.

A further object is the provision of such a device which is adapted to hoist the reel from the ground and to move it forwardly to a position above the center of the supporting tread, and hoist operating mechanism adapted to control the raising and lowering movement of the hoist.

In the accompanying drawings illustrating a specific embodiment of my invention, Fig. 1 is a side elevation of a vehicle incorporating my invention;

Fig. 2 is a plan view of that shown in Fig. 1;

Figs. 3 and 4 are perspective views of that shown in Figs. 1 and 2 illustrating the reel supporting brackets in reel transporting position and in reel receiving position respectively;

Fig. 5 is an enlarged horizontal section through the gear mechanism for actuating the reel supporting brackets; and Fig. 6 is an enlarged longitudinal section through the extensible members which actuate the reel supports.

Referring particularly to Figs. 1 and 2, the trailer therein illustrated comprises a main frame 5 which is resiliently mounted upon a compound leaf spring 6 by brackets 7 and shackles 8. The spring 6 is fixed to the supporting brackets 9 by bolts 11 which pass through the plate 12 seated on the upper surface of the spring 6. The brackets 9 have downwardly and forwardly extending portions 14 through which the main axle 13 extends and is secured therein by bolts 15 which clamp the split portions 16 and 17 of the brackets 14 about the ends of the axle 13. The axle 13 being offset forwardly, as best illustrated in Figs. 1 and 2, provides adequate space for the cable carrying reel of large diameter which is illustrated by the broken line 18. The brackets 9 are provided with stub axles 20 which extend from centrally beneath the springs 6 outwardly through the central portions of track laying wheel units comprising a tread 21 and wheel elements 22 shown diagrammatically. The stub axles 20 have fixed thereon wheel tie members 23 in which are fixed at the opposite ends stub axles 24 on which the tread supporting wheels 22 are journaled.

The main frame 5 preferably consists of channel members secured to each other by cross channels 26 and 27 which are fixed in place by corner angle plates 28. The main frame is provided with brackets 31 having bolts or studs 32 on which are hingedly secured the reel supporting brackets 33. The brackets 33 are provided with hook portions 34 on their rear ends for engaging beneath the axle or bar 35 which passes through the center of the reel 18 for supporting the same, as best illustrated in the dotted line position of the bracket in Fig. 1.

When the brackets 33 are in the position illustrated in broken outline, bar 35 rests against the hooks 34 and may be lifted thereby to the position shown in full lines in Figs. 1 and 3, in which position the bar 35 rolls forwardly and engages the hook portions 36 on the forward edge of the brackets and may be confined to that position by pins 37 passing through the rearward edge of the hook portions 36 and downwardly through a portion of the bracket. The hook portions 36 are provided with closures 36' for the ends to prevent axial movement of the bar 35. The portions 36' slightly diverge toward the rear as at 35' to facilitate the entrance of the bar 35 therein. When it is desired to remove the reel from the brackets it is only necessary, first to remove the pins 37 and then to tilt the brackets to the position shown in Fig. 4 and in dotted outline in Fig. 1 such that the hook 34 will pass under the bar 35. The height of the bar 35 from the ground will depend on the diameter of the reel being hoisted or released and I have provided mechanism for oscillating the brackets 33 in order that they may extend sufficiently close to the ground to engage cable reels of relatively small diameter, although the forwardly offset position of the axle 13 permits a very large cable reel to be moved in between the wheel units sufficiently to be engaged and lifted by the hook portions 34 of the brackets.

The mechanism for oscillating the brackets 33 comprises a hollow shaft 41 operably secured to a bracket 33 through the medium of a pivot pin 42 and a hinge element 43 which has a cylindrical portion 44 thereon fixed within the rearward end of the hollow shaft 41 by bolts 45. To the forward end of the shaft 41 is fixedly secured, as by welding or brazing at 46, an internally threaded nut 47 having engagement at 47' with the threads 48 on the shaft 49. To the forward end of the nut 47 is secured a sleeve element 51 which extends forwardly over the shaft 49 and is provided with a stop element 52 which is adapted to slide upon the shaft 49 and is adapted, upon its extreme forward movement, to engage a packing element 53 fixed to the shaft 49 by a set screw 54. The engagement of the stop element 52 with the member 53 limits the forward movement of the sleeve 51 and the hollow shaft 41.

In order to controllably rotate the shaft 49, the forward end thereof is provided with a gear 56 journaled in a gear box 57, which gear box is in turn journaled at 58 and 59 in brackets 61 which are rigid with the main frame of the vehicle. The gear 56 on the shaft 49 meshes with a pinion 62 on a cross shaft 63 which extends through the gear box 57 and is provided at one end with a hand wheel 64 having a grip 65 thereon by which the shaft 63 may readily rotate in either direction, thereby rotating the shaft 49 to raise and lower the brackets 33. As the threads 48 on the shaft 49 have a relatively low pitch, it will be appreciated that a very great load may be lifted on the brackets 33 with facility and the load can not reverse the rotation of the shaft 49.

The end of the shaft 63 opposite the hand wheel 64 is coupled to a cross shaft 67 which is in turn coupled to another shaft 63 in the other gear box 57 as shown in Fig. 2. The hand wheel 64 may be secured to either shaft 63 by a pin 68 so that a reel may be lifted or lowered from either side of the vehicle.

In order to rigidly support the members 33 from lateral movement I have provided quadrants 75 on each side of the frame fixed thereto by clamping bolts 76 passing through the frame. The supporting members 33 are provided with laterally extending hook portions 77 which embrace the upper side of the quadrants and are guided thereby throughout their range of oscillation.

From the foregoing description and the drawings it will be appreciated that certain changes and modifications may be made without departing from the principle of this invention and I desire to avail myself of such modifications as come within the scope of the appended claims.

I claim as my invention:

1. A vehicle comprising in combination a track laying wheel unit, a frame resiliently supported thereon, said unit comprising end brackets and an offset axle to provide space for a cable reel, cable reel brackets pivoted to said frame, mechanism for actuating said brackets to raise and lower a reel supported thereby, said actuating mechanism comprising a pair of telescoping units, each unit being pivotally connected to one of said reel brackets and to said frame at a point remote from the point of pivoting of said cable reel brackets on said frame.

2. A vehicle for transporting a cable reel comprising reel supporting brackets, a frame, means pivotally securing said brackets to said frame to tilt rearwardly, wheel units supporting said frame, said wheel units including an offset axle arranged to provide space for the reel, and mechanism for tiltingly actuating said brackets, comprising telescoping members operably connecting the upper end of each cable reel bracket to a forward portion of said frame.

3. A vehicle comprising in combination a frame, a track laying wheel operably connected with and supporting said frame, reel supporting brackets on said frame mechanically interconnected to move simultaneously, pivot means securing the lower ends of said brackets to said frame, to permit oscillatory movement thereof, telescoping means operably secured to a forward portion of said frame and pivoted to the upper ends of said brackets, and means mounted on the frame adapted to effect the extension and contraction of said telescoping means.

4. A vehicle comprising in combination a track laying wheel unit, a frame resiliently supported thereon, said unit comprising end brackets and an offset axle to provide space for a cable reel, a pair of cable reel brackets pivoted to said frame, mechanism for actuating said brackets to raise and lower a reel supported thereby, said actuating mechanism comprising a pair of extensible means each operably secured to a forward portion of said frame and pivoted to the upper end of one of said reel supporting brackets.

5. A vehicle for transporting a cable reel comprising a pair of reel supporting brackets, a frame, means pivotally securing said brackets to said frame to tilt rearwardly, wheel units supporting said frame, said wheel units including an offset axle arranged to provide space for the reel, and mechanism for tiltingly actuating said brackets, said actuating mechanism comprising a pair of extensible means each extending forwardly from its bracket and each operably secured to a forward portion of said frame and pivotally secured to the upper ends of said reel supporting brackets.

6. A vehicle comprising in combination a track laying wheel unit, a frame resiliently supported thereon, said unit comprising end brackets and an offset axle to provide space for a cable reel, a pair of cable reel brackets pivoted to said frame mechanism for actuating said brackets to raise and lower a reel supported thereby, said actuating mechanism comprising a pair of telescoping members each of which is pivotally connected to one of said cable reel brackets and to said frame at a point remote from the point of pivoting of said cable reel brackets on said frame, said cable reel brackets comprising hook portions adapted to operably engage and hoist a reel to a transporting position.

7. A vehicle for transporting a cable reel comprising a pair of reel supporting brackets, a frame, means pivotally securing said brackets to said frame to tilt rearwardly, wheel units supporting said frame, said wheel units including an offset axle arranged to provide space for the reel, and mechanism for tiltingly actuating said brackets, comprising a pair of telescoping members each operably connecting the upper end of one of the cable reel brackets to a forward portion of said frame, said cable reel brackets comprising hook portions adapted to operably engage and hoist a reel to transporting position, and common means for actuating both telescoping members to swing said brackets simultaneously.

8. A vehicle comprising in combination a frame, a track laying wheel operably connected with and supporting said frame, a pair of reel supporting brackets on said frame mechanically interconnected to move simultaneously, pivot means securing the lower ends of said brackets to said frame, to permit oscillatory movement thereof, a pair of extensible means each operably secured to a forward portion of said frame and pivoted to the upper end of one of said brackets, said cable reel brackets comprising hook portions adapted to operably engage and hoist a reel to transporting position, and common means operable from both sides of the vehicle for actuating said extensible means.

9. A vehicle comprising in combination a track laying wheel unit, a frame resiliently supported thereon, said unit comprising end brackets and an offset axle to provide space for a cable reel, a pair of independent cable reel brackets pivoted to said frame, mechanism for actuating said brackets to raise and lower a reel supported thereby, said actuating mechanism comprising extensible means operably secured to a forward portion of said frame and pivoted to the upper ends of said reel supporting brackets, oppositely disposed hooks on said cable reel brackets for limiting the movement of a reel supported on the brackets, and quadrants rigidly mounted on the frame supporting the cable reel brackets against lateral displacement.

10. A vehicle for transporting a cable reel comprising a pair of reel supporting brackets, a frame, means pivotally securing said brackets to said frame to tilt rearwardly, wheel units supporting said frame, said wheel units including an offset axle arranged to provide space for the reel, and mechanism for tiltingly actuating said brackets, said actuating mechanism comprising a pair of extensible means each operably secured to a forward portion of said frame and pivotally secured to the upper end of one of said reel supporting brackets, and oppositely disposed hooks on said cable reel brackets for limiting the movement of a reel supported on the brackets.

11. In a cable reel transporting device of the class described in combination, a frame, a pair of independent reel supporting brackets pivoted to said frame and mechanically interconnected to move simultaneously, a pair of actuating mechanisms each adapted to oscillate one of said reel supporting brackets in one direction to reel receiving position and in the opposite direction to reel transporting position, and common means for operating both mechanisms simultaneously.

12. In a cable reel transporting device of the class described in combination, a frame, a pair of reel supporting brackets pivoted to said frame and mechanically interconnected to move simultaneously, and actuating mechanism for oscillating said reel supporting brackets in one direction to reel receiving position and in the opposite direction to reel transporting position, said actuating mechanism comprising a pair of forwardly extending extensible means each operably secured to said frame and to the upper portion of one of said reel supporting means.

13. In a cable reel transporting device of the class described in combination, a frame, a pair of reel supporting brackets pivoted to said frame and mechanically interconnected to move simultaneously, and actuating mechanism for oscillating said reel supporting means in one direction to reel receiving position and in the opposite direction to reel transporting position comprising a pair of extensible members, each being pivoted to the frame and to one of the brackets, said reel supporting means comprising hook portions adapted to operably engage and hoist a reel to transporting position.

14. In a cable reel transporting device of the class described in combination, a frame, a pair of reel supporting brackets pivoted to said frame and mechanically interconnected to move simultaneously, actuating mechanism for oscillating said reel supporting brackets in one direction to reel receiving position and in the opposite direction to reel transporting position comprising individual actuating means for operating each bracket and common actuating means for operating both brackets simultaneously, and oppositely disposed hook portions on said cable reel supporting brackets for limiting the movement of a reel positioned on said supports.

15. In a cable reel transporting device of the class described in combination, a frame, a pair of reel supporting brackets pivoted to said frame and mechanically interconnected to move simultaneously, actuating mechanism for oscillating said reel supporting means in one direction to reel receiving position and in the opposite direction to reel transporting position, said actuating mechanism comprising a pair of extensible means operably secured to said frame and to the upper portion of said reel supporting means, common actuating means for operating said extensible means simultaneously, and operative means therefor on both sides of the frame, said reel supporting means comprising hook portions adapted to operably engage and hoist a reel to transporting position.

16. In a cable reel transporting device of the class described in combination, a frame, a pair of independent reel supporting brackets pivoted to said frame, actuating mechanism for oscillating said reel supporting brackets in one direction to reel receiving position and in the opposite direction to reel transporting position, said actuating mechanism comprising a pair of extensible means each operably secured to said frame and to the upper portion of one of said reel supporting means, oppositely disposed hook portions on said cable reel supports for limiting the movement of a reel positioned on said supports, and a pair of quadrants each engaged by one of said brackets to prevent lateral displacement thereof.

17. A vehicle for hoisting and transporting cable reels comprising in combination a frame, a track laying wheel unit operably connected with and supporting said frame, said unit comprising end brackets and a forwardly offset axle to provide space for a cable reel, cable reel supports on said frame, means pivotally securing said supports to said frame at points substantially vertically above said offset axle to permit oscillation thereof, quadrant guides on said frame engaging and guiding said supports throughout their range of oscillation, and rigid telescoping means secured to said supports and to said frame for oscillating said supports between reel receiving position and reel transporting position.

18. A vehicle for hoisting and transporting cable reels comprising in combination a frame, a track laying wheel unit operably connected with and supporting said frame, said unit comprising end brackets and a forwardly offset axle to provide space for a cable reel, cable reel supports on said frame, means pivotally securing said supports to said frame at points substantially vertically above said offset axle to permit oscillation thereof, quadrant guides on said frame engaging and guiding said supports throughout their range of oscillation, actuating mechanism for said supports comprising extensible telescoping members operably connected to said supports and to said frame remote from said supports, said telescoping members having mutually threaded engagement, and means for selectively rotating one of said members in opposite directions.

19. A vehicle for hoisting and transporting cable reels comprising in combination a frame, a track laying wheel unit operably connected with and supporting said frame, said unit comprising end brackets and a forwardly offset axle to provide space for a cable reel, cable reel supports on said frame, means pivotally securing said supports to said frame at points substantially vertically above said offset axle to permit oscillation thereof, quadrant guides on said frame engaging and guiding said supports throughout their range of oscillation, and oppositely disposed hook portions on said cable reel supports for limiting the movement of a reel positioned on said supports.

JOSEPH KUCHAR.